US011188761B2

(12) United States Patent
Stelzer et al.

(10) Patent No.: US 11,188,761 B2
(45) Date of Patent: Nov. 30, 2021

(54) CAMERA SURVEILLANCE PLANNING AND TRACKING SYSTEM

(71) Applicant: THE MITRE CORPORATION, McLean, VA (US)

(72) Inventors: Emily Stelzer, McLean, VA (US); Ronald S. Chong, McLean, VA (US); Shuo Chen, McLean, VA (US); Jacob Richkus, McLean, VA (US); Dave Tuomey, McLean, VA (US); Vilas Nene, McLean, VA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 16/401,516

(22) Filed: May 2, 2019

(65) Prior Publication Data
US 2019/0258869 A1  Aug. 22, 2019

Related U.S. Application Data

(63) Continuation of application No. 14/988,603, filed on Jan. 5, 2016, now Pat. No. 10,318,819.

(51) Int. Cl.
| | |
|---|---|
| *G06K 9/00* | (2006.01) |
| *H04N 7/18* | (2006.01) |
| *H04N 5/247* | (2006.01) |
| *G06T 7/593* | (2017.01) |
| *G06T 7/246* | (2017.01) |
| *H04N 5/225* | (2006.01) |
| *H04N 13/239* | (2018.01) |

(52) U.S. Cl.
CPC .......... *G06K 9/00771* (2013.01); *G06T 7/246* (2017.01); *G06T 7/593* (2017.01); *H04N 5/2258* (2013.01); *H04N 5/247* (2013.01); *H04N 7/181* (2013.01); *H04N 13/239* (2018.05); *G06T 2207/30232* (2013.01); *G06T 2207/30241* (2013.01)

(58) Field of Classification Search
CPC ..... G06K 9/00771; G06T 7/246; G06T 7/593; G06T 2207/30241; G06T 2207/30232; H04N 7/181; H04N 5/247
See application file for complete search history.

(56) References Cited

U.S. PATENT DOCUMENTS

| | | |
|---|---|---|
| 8,705,799 B2 | 4/2014 | White et al. |
| 2001/0039474 A1 | 11/2001 | Hayashi et al. |
| 2003/0053658 A1 | 3/2003 | Pavlidis |
| (Continued) | | |

OTHER PUBLICATIONS

Office Action, dated Jan. 10, 2018, for U.S. Appl. No. 14/988,576, filed Jan. 5, 2016.

(Continued)

*Primary Examiner* — Nasim N Nirjhar
(74) *Attorney, Agent, or Firm* — Sterne, Kessler, Goldstein & Fox P.L.L.C.

(57) ABSTRACT

Disclosed herein are system, method, and computer program product embodiments for camera surveillance planning and tracking using, for example, infrared technologies. An embodiment operates by receiving a camera specification input and placement input, calculating a surveillance coverage based on the camera specification and the placement input, displaying the surveillance coverage on a map, and identifying at least one stereo pair.

20 Claims, 9 Drawing Sheets

(56) References Cited

U.S. PATENT DOCUMENTS

| | | |
|---|---|---|
| 2003/0053659 A1 | 3/2003 | Pavlidis et al. |
| 2010/0045799 A1* | 2/2010 | Lei .......................... G06T 7/254 |
| | | 348/169 |
| 2011/0064268 A1 | 3/2011 | Cobb et al. |
| 2012/0197600 A1 | 8/2012 | Bai et al. |
| 2013/0058532 A1 | 3/2013 | White et al. |
| 2013/0130845 A1 | 5/2013 | Marty et al. |
| 2013/0329052 A1 | 12/2013 | Chew |
| 2014/0211987 A1* | 7/2014 | Fan ...................... G06K 9/3241 |
| | | 382/103 |
| 2014/0226024 A1 | 8/2014 | Limbaugh et al. |
| 2015/0287214 A1* | 10/2015 | O'Gorman .............. G06T 7/292 |
| | | 348/159 |
| 2016/0086052 A1* | 3/2016 | Piekniewski ............. G06T 3/00 |
| | | 382/103 |
| 2017/0193648 A1 | 7/2017 | Stelzer et al. |
| 2017/0206423 A1* | 7/2017 | Ju ............................ G06T 7/11 |

OTHER PUBLICATIONS

Avidan et al.—Trajectory Triangulation: IEEE Transactions on Pattern Analysis and Machine Intelligence, vol. 22, No. 4, Apr. 2000, 10 pages.

\* cited by examiner

CAMERA SURVEILLANCE PLANNING AND TRACKING SYSTEM

CROSS-REFERENCE TO RELATED APPLICATIONS

This application is a continuation of U.S. patent application Ser. No. 14/988,603, filed Jan. 5, 2016, which is incorporated by reference in its entirety. This application is also related to U.S. Pat. No. 10,140,872, titled "Camera Surveillance Planning and Tracking System," filed Jan. 5, 2016, which is herein incorporated by reference in its entirety.

BACKGROUND

Domestically, there are currently about 450 towered airports in the United States that do not have any significant surveillance capabilities to prevent potentially unsafe travel conditions. While there are surveillance technologies available to these airports, such as radar (for example X-band radar), millimeter wavelength radar, multilateration, ADS-B capabilities, and virtual out-the-window capabilities based on camera technologies, these technologies are expensive and cannot be economically justified by small to medium-sized airports. Further, some of these technologies require equipage by vehicles and aircraft; thus, unequipped targets would be unseen by even by some of these technologies. This leaves small to medium-sized airports without any way to reliably detect and track vehicles and aircraft on the airport surface.

SUMMARY

Provided herein are system, apparatus, article of manufacture, method and/or computer program product embodiments, and/or combinations and sub-combinations thereof, for camera surveillance planning and object tracking.

An embodiment includes a computer implemented method for the construction of a surveillance plan. The method operates by receiving a camera specification and placement input, calculating a surveillance coverage of a camera according to the camera specification and the placement input, wherein the surveillance coverage comprises an area of a map, displaying the surveillance coverage of the camera on the map, and identifying at least one valid stereo pair according to the surveillance coverage.

Another embodiment includes a system for the construction of a surveillance plan. The system includes a memory and at least one processor coupled to the memory. The processor is configured to receive a camera specification and placement input, calculate a surveillance coverage of a camera according to the camera specification and the placement input, wherein the surveillance coverage comprises an area of a map, display the surveillance coverage of the camera on the map, and identify at least one valid stereo pair according to the surveillance coverage.

A further embodiment includes a non-transitory computer-readable device having instructions stored thereon that, when executed by at least one computing device, cause the computing device to perform operations. The operations include receiving a camera specification and placement input, calculating a surveillance coverage of a camera according to the camera specification and the placement input, wherein the surveillance coverage comprises an area of a map, displaying the surveillance coverage of the camera on the map, and identifying at least one valid stereo pair according to the surveillance coverage.

BRIEF DESCRIPTION OF THE DRAWINGS

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for camera surveillance planning and tracking. In a non-limiting embodiment, the camera surveillance planning and tracking system uses infrared technologies although other imaging technologies could alternatively be used—for example, spectral imaging, radar, sonar, ultraviolet, and visible light technologies, to name a few.

Figure 1:
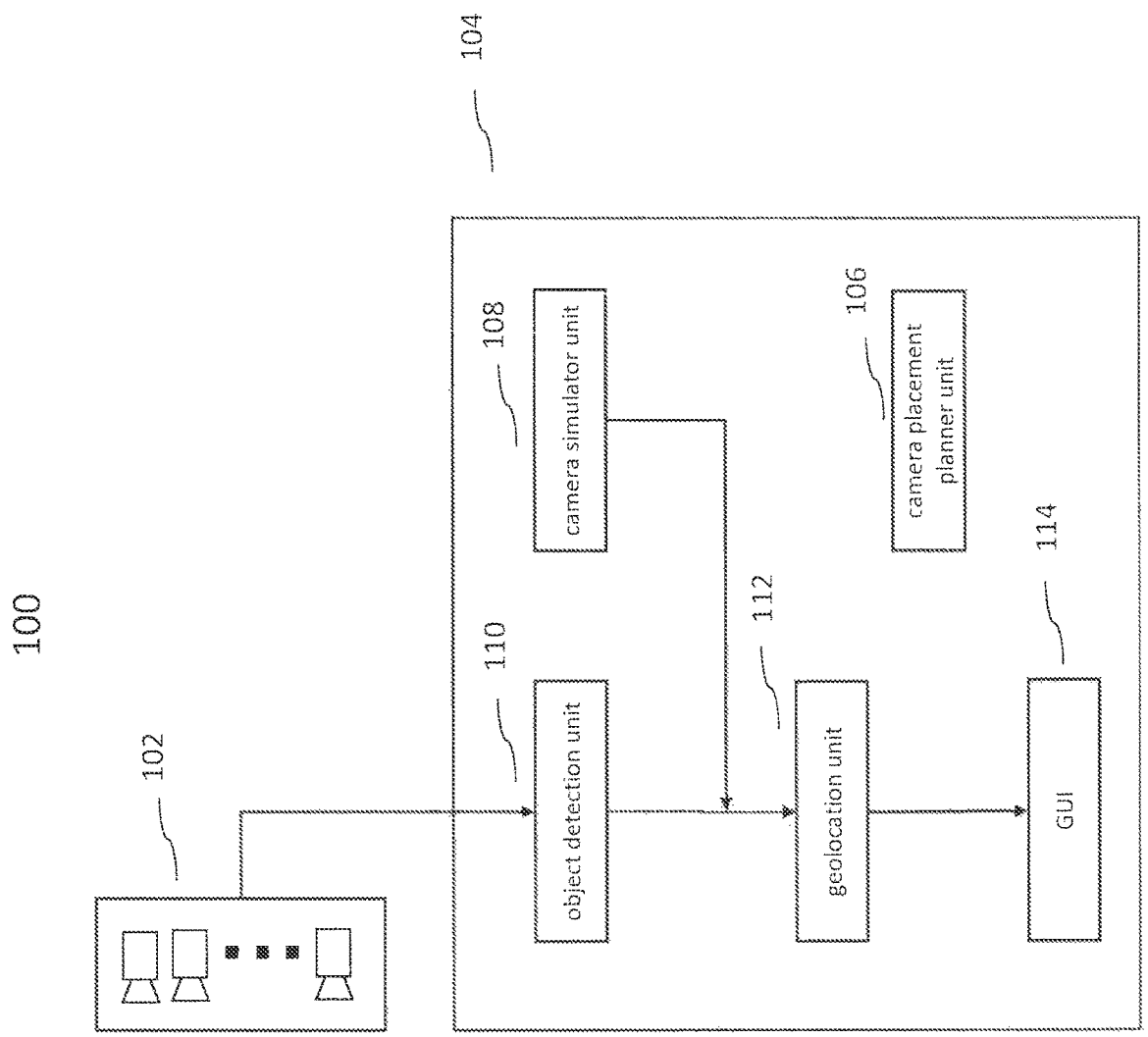
FIG. 1 is a block diagram of a camera surveillance planning and tracking system 100, according to an example embodiment.

FIG. 1 is a block diagram of a camera surveillance planning and tracking system 100. In an embodiment, camera surveillance planning and tracking system 100 constructs and visualizes a surveillance plan for an area by displaying surveillance coverages corresponding to a plurality of cameras 102 according to inputs received.

In an embodiment, the camera surveillance planning and tracking system 100 may include a plurality of cameras 102 that are installed according to the surveillance plan constructed by surveillance planning and tracking tool 104. The plurality of cameras 102 may transmit streams of video to surveillance planning and tracking tool 104 to track and geolocate objects from the streams of video. The camera surveillance and tracking tool 104 may comprise camera placement planner unit 106, camera simulator unit 108, object detection unit 110, geolocation unit 112, and graphic user interface (GUI) 114.

Although camera surveillance planning and tracking tool 104 is represented in FIG. 1 as a single physical machine, this is presented by way of example, and not limitation. In an additional embodiment, camera placement planner unit 106, camera simulator unit 108, object detection unit 110, geolocation unit 112, and graphic user interface (GUI) 114 may be made up of multiple physical machines in any combination thereof. In a further embodiment, the plurality of cameras 102, camera placement planner unit 106, camera simulator unit 108, object detection unit 110, geolocation unit 112, and GUI 114 communicate over a wired or wireless network.

In an embodiment, camera placement planner unit 106 constructs and displays a surveillance plan for an area according to a placement input received. The surveillance plan may comprise displayed cameras and surveillance coverages on the map of an area. Camera placement planner unit 106 may receive a placement input corresponding to a camera of the plurality of cameras 102. The placement input may comprise a location for the camera, a specification input, and a pose for the camera, to name a few. Camera placement unit 106 may then display the camera on a map of an area based on the location for the camera.

According to an embodiment, camera placement planner unit 106 may calculate and display the surveillance coverage, or field of view, for the camera on a map of an area according to the placement input received. Camera placement planner unit 106 may display the surveillance coverage for the camera on a georeferenced plan view of an airport, as a non-limiting example.

According to an embodiment, camera placement planner unit 106 may receive a plurality of placement inputs corresponding to a plurality of cameras 102. Camera placement planner unit 106 may construct a surveillance plan based on the plurality of placement inputs and display the plurality of cameras 102 and surveillance coverages for the plurality of cameras 102 on a map of an area according to the placement inputs.

In an embodiment, the plurality of cameras 102 may be installed according to the surveillance plan, i.e. how the plurality of cameras 102 are displayed on the map of an area by camera placement planner unit 106. The cameras 102 may undergo an intrinsic calibration procedure and an extrinsic calibration procedure. According to an embodiment, after the cameras undergo the intrinsic calibration procedure and extrinsic calibration procedure, an updated specification input and updated pose may be calculated. The updated specification input and updated pose may be sent to camera placement planner unit 106. This is described in further detail below with reference to FIG. 2.

According to an embodiment, once the cameras 102 have been installed in the area displayed by camera planner 106 according to the placement inputs, camera placement planner unit 106 may determine which of the cameras within the plurality of cameras 102 are valid stereo pairs, as described below with reference to FIG. 3.

In an embodiment, camera simulator unit 108 may receive a simulation object input. The simulation object input may comprise a 3D position on the map displayed by camera placement planner unit 106. In an embodiment, the simulation object input simulates the 3D position of an object of interest detected in the area displayed by the camera placement planner unit 106.

Camera simulator unit 108 may then use projective geometry and other techniques to compute where the 3D simulation object input would appear on the image of the plurality of cameras specified in the surveillance plan constructed and displayed in the camera placement planner unit 106. This computation produces in a plurality of 2D (pixel) locations, one for each of the cameras 102 that can image the simulation object input. Camera simulator unit 108 may compile a plurality of object detection points. The object detection points may comprise a unique camera identifier, 2D (pixel) location, and/or unique identifier of the simulation object input. In an embodiment, camera simulator unit 108 may receive a plurality of simulation object inputs.

According to another embodiment, camera surveillance planning and tracking system 100 may track a plurality of objects from streams of video transmitted by the plurality of cameras 102.

Object detection unit 110 may receive a continuous stream of video from a camera. The continuous stream of video may comprise video captures from the surveillance areas of the cameras 102. Object detection unit 110 may then use background subtraction and filtering to identify an object of interest in the video, as described below with reference to FIG. 4. In an embodiment, object detection unit 110 may estimate an object of interest's trajectory based upon the subtraction and filtering of the video.

In an embodiment, object detection unit may compile data related to the object of interest, including locating information, identifying information, and movement information, to name a few. Object detection unit 110 may compile a plurality of object detection points based upon the object of interest. The object detection points may comprise a unique camera identifier, 2D (pixel) location, and data regarding the size, trajectory, and/or unique identifier of the object of interest.

In an embodiment, object detection unit 110 may receive a plurality of continuous streams of video from the plurality of cameras 102.

According to an embodiment, geolocation unit 112 may receive a plurality of object detection points from camera simulation unit 108 when a simulation object input is provided to the camera simulation unit 108.

According to an embodiment, geolocation unit 112 may receive a plurality of object detection points from object detection unit 110 when the objects of interest are detected across a set threshold of frames in continuous video streams.

Figure 6:
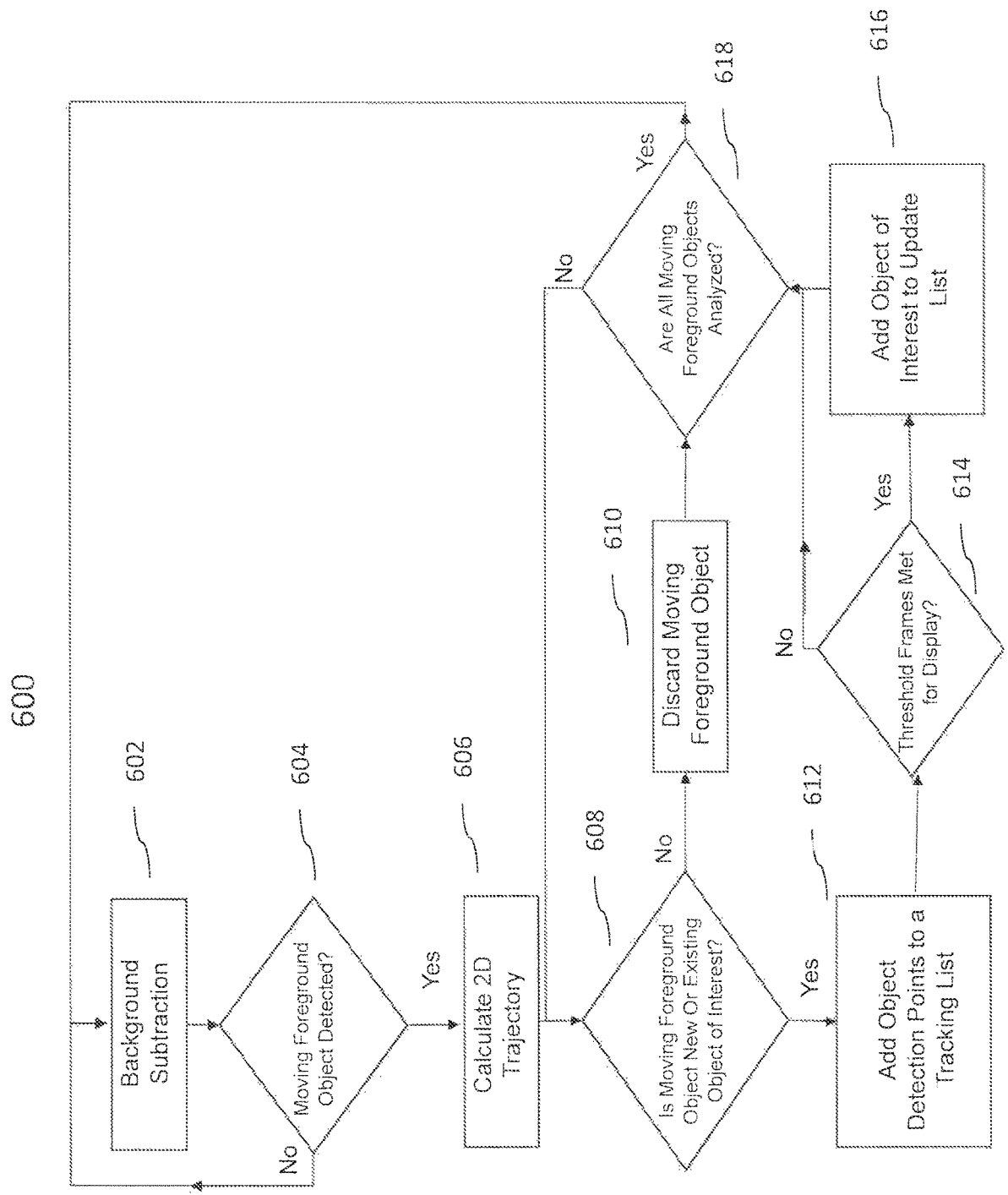
FIG. 6 is a flowchart illustrating a process for determining an object of interest from a continuous stream of video, according to an example embodiment.

Geolocation unit 112 may then process the object detection points, received from the object detection unit 110 and/or the camera simulation unit 108, for any distortions and calculate a three-dimensional (3D) position—latitude, longitude, and altitude—from the processed object detection points using 3D triangulation for presentation in GUI 114, as discussed further in FIG. 6. 3D triangulation may comprise calculating the altitude of an object of interest by comparing the location of the object of interest in frames of continuous video streams. In an embodiment, the frames are received from the cameras within a valid stereo pair. According to an embodiment, geolocation unit 112 may receive a plurality of object detection points from detection unit 110 and calculate a plurality of 3D positions based upon the plurality of object detection points.

In an embodiment, geolocation unit 112 may determine whether the 3D position is invalid, as discussed below with reference to FIG. 6.

According to an embodiment, geolocation unit 112 may comprise an object tracker. The object tracker may maintain the continuity of the 3D positions calculated from the object detection points when object detection unit 110 cannot support the continuous presence of previously detected objects.

According to an embodiment, geolocation unit 112 may display the computed 3D positions on the map displayed by camera placement planner unit 106. The geolocation unit 112 may highlight the valid stereo pairs of cameras that produced the object detection points used to perform the computation.

In an embodiment, GUI 114 may receive the 3D position from geolocation unit 112. GUI 114 displays an area divided into a plurality of blocks. According to an embodiment, the area displayed by GUI 114 may comprise the area displayed by camera planning unit 106. In an embodiment, GUI 114 may comprise a block area object tracker. When the 3D position received comprises a position for an object of interest within one of the plurality of blocks, block area object tracker may highlight the block corresponding to the object of interest's position, as discussed further in FIG. 7.

According to an embodiment, GUI 114 may receive a plurality of 3D positions. GUI 114 may highlight a plurality of blocks according to the 3D positions received. GUI 114 may display the number of objects of interest within each highlighted block according to the 3D positions.

In an embodiment, GUI 114 may receive an updated 3D position for an object of interest. From the updated 3D position, the block area object tracker may calculate an averaged position, comprising a latitude, longitude, and altitude, for the object of interest. Using the averaged position, block area object tracker may correct any discontinuities in the blocks the object of interest moves between. Block area object tracker may maintain the continuity of an object of interest when geolocation unit 112 cannot support the continuous presence of previously detected objects.

Figure 2:
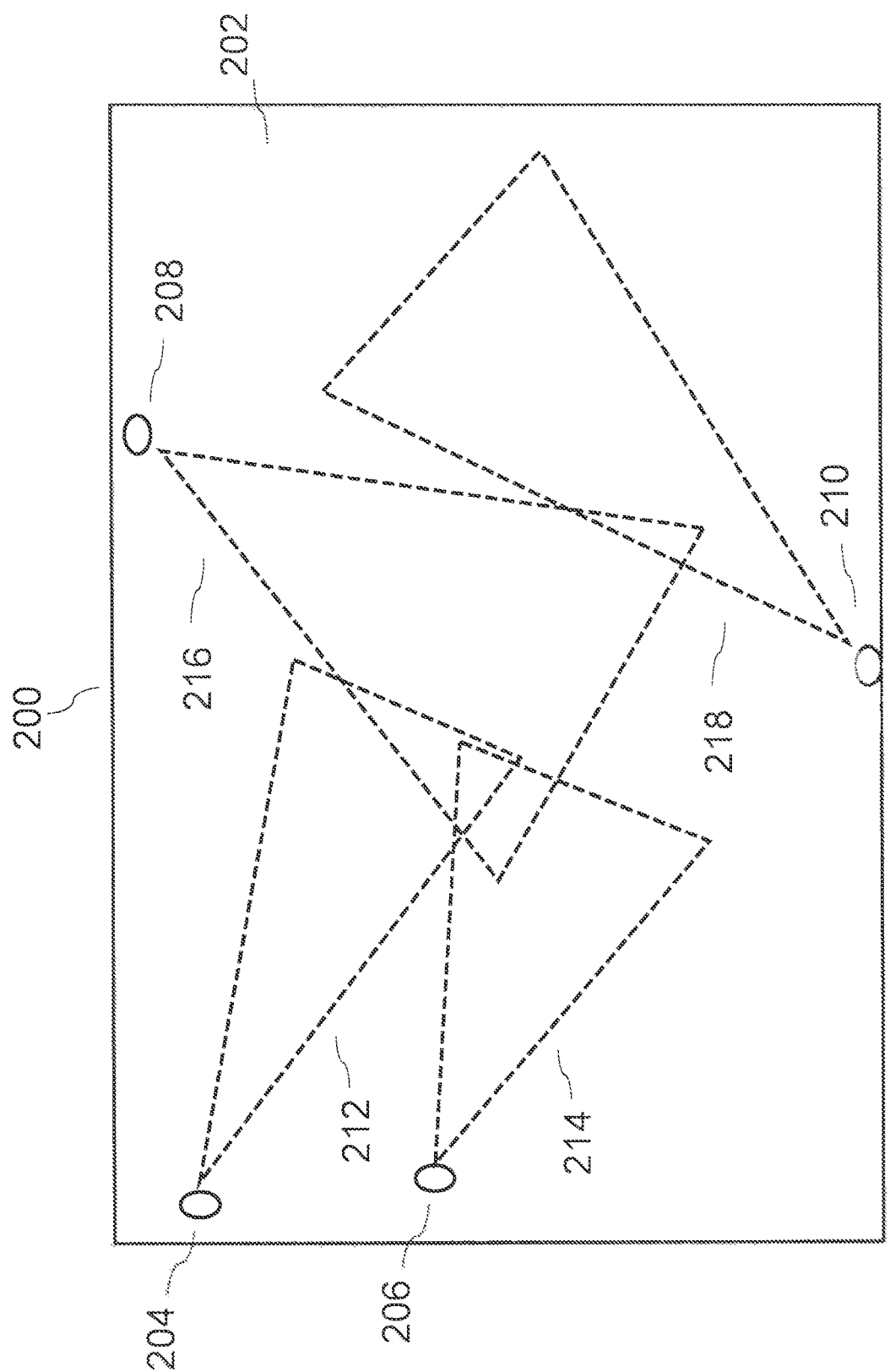
FIG. 2 is a diagram illustrating an example camera placement planner unit 106 displaying example surveillance coverages A, B, C, and D (212, 214, 216, and 218, respectively) of cameras A, B, C, and D (204, 206, 208, and 210, respectively) on a map 200 of an area 202, according to an example embodiment.

FIG. 2 is a diagram illustrating an example of camera placement planner unit 106 displaying a surveillance plan 200 comprising surveillance coverages A, B, C, and D (212, 214, 216, and 218, respectively) for cameras A, B, C, and D (204, 206, 208, and 210, respectively) on a map of an area 202 constructed by camera placement planner unit 106, according to an embodiment.

In an embodiment, camera placement planner unit 106 receives a placement input for a camera. The placement input may comprise a specification input and pose. The specification input may comprise attributes relating to specifications of a camera, such as the focal length, field of view, and notional visual range, to name a few. According to an embodiment, the pose may comprise the camera x location, camera y location, camera z location, camera elevation angle, camera azimuth angle, and camera roll angle. According to an embodiment, the camera x location, camera y location, and camera z location may comprise locations on a map of an area 202.

When camera placement planner unit 106 receives the placement input for a camera, the camera is added to the surveillance plan 200 and displayed on the map of an area 202 according to the placement input received. For example, camera placement 106 may receive a placement input for camera A 204 comprising a certain camera x location, camera y location, and camera z location that correspond to axes of the map of an area 202. Based upon these three locations, camera A 204 will be displayed on the map according to the camera x location, camera y location, and camera z location received.

According to an embodiment, camera placement planner unit 106 may also calculate a surveillance coverage for the camera. The surveillance coverage may be calculated based upon the specification input and pose of the placement input for a camera. Once calculated, the surveillance coverage may be added to the surveillance plan 200 and displayed on the map of the area 202.

For example, camera placement planner unit 106 may receive a placement input comprising the pose for camera A 204 and a specification input comprising the manufacturer's specifications for the focal length, field of view, and notional visual range of camera A 204. According to the placement input, camera placement plan 106 can calculate surveillance area A 212, or field of view, of camera A 204. Camera placement planner unit 106 can then add camera A 204 and surveillance area A 212 to the surveillance plan 200 and display them on the map of the area 202.

In an embodiment, camera placement planner unit 106 may receive an updated specification input when a camera undergoes an intrinsic calibration process. The intrinsic calibration process may comprise calibrating the intrinsic parameters of the camera—for example, the focal length, image sensor format, lens distortion, and principal point, to name a few. The updated specification input may comprise a focal length, field of view, and notional visual range of a camera calculated during the intrinsic calibration process.

Camera placement planner unit 106 may update the surveillance plan 200 with an updated surveillance coverage of a camera according to the updated specification input. According to an embodiment, updating the surveillance plan 200 with an updated surveillance coverage of a camera may comprise calculating an updated surveillance coverage based on the updated specification input, adding the updated surveillance coverage to the surveillance plan 200, displaying the updated surveillance coverage of the camera on a map of an area 202, and removing the former surveillance coverage of the camera from the surveillance plan 200.

For example, camera A 204 may undergo an intrinsic calibration where an updated specification input comprising a focal length, field of view, and notional visual range is calculated. When camera placement planner unit 106 receives the updated specification input, camera placement planner unit 106 can calculate a new surveillance coverage for camera A 204 based on the updated specification input. Camera placement planner unit 106 may then update the surveillance plan 200 with the new surveillance coverage by adding the new surveillance coverage for camera A 204 to surveillance plan 200, displaying the updated surveillance coverage for camera A 204 on the map of an area 202, and removing surveillance coverage A 212 from surveillance plan 200.

According to an embodiment, camera placement planner unit 106 may receive an updated pose when a camera undergoes an extrinsic calibration process. The extrinsic calibration process may comprise calibrating the extrinsic parameters of the camera—for example, the coordinate system transformation of the camera. The updated pose may comprise the updated position and orientation of a camera calculated during the extrinsic calibration process. Camera placement planner unit 106 may then update the surveillance plan 200 with an updated surveillance coverage according to the updated pose.

For example, camera A 204 may undergo an extrinsic calibration process. During the extrinsic calibration process, an updated pose may be calculated for camera A 204 and sent to camera placement planner unit 106. When camera placement planner unit 106 receives the updated pose, camera placement planner unit 106 can calculate a new surveillance coverage for camera A 204 based on the updated pose. Camera placement planner unit 106 may then update the surveillance plan 200 with the new surveillance coverage by adding the new surveillance coverage for camera A 204 to surveillance plan 200, displaying the updated surveillance coverage for camera A 204 on the map of an area 202, and removing surveillance coverage A 212 from surveillance plan 200.

In an embodiment, camera placement planner unit 106 may receive both an updated specification input and updated pose and calculate an updated surveillance coverage for a camera according to the updated specification input and updated orientation. Camera placement planner unit 106 may then update the surveillance plan 200 with the updated surveillance coverage of a camera.

Figure 3:
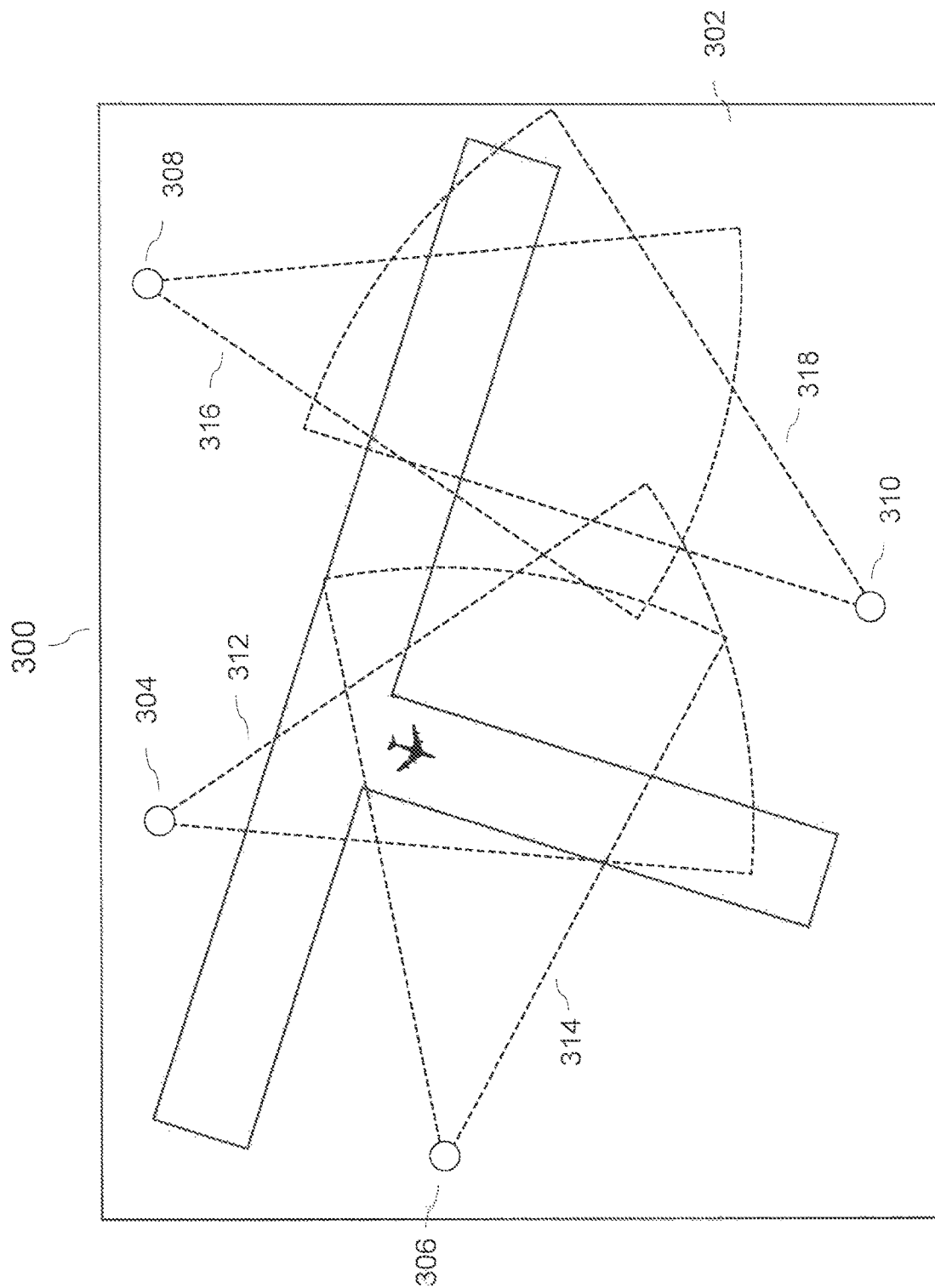
FIG. 3 is a diagram illustrating an example of camera placement planner unit 106 displaying example surveillance coverages A, B, C, and D (312, 314, 216, and 218, respectively) of cameras A, B, C, and D (304, 306, 308, and 210, respectively) on a map 300 of an airport 302, according to a non-limiting example embodiment.

FIG. 3 is a diagram illustrating an example of camera placement planner unit 106 displaying example surveillance coverages A, B, C, and D (312, 314, 216, and 218, respectively) of cameras A, B, C, and D (304, 306, 308, and 210, respectively) on a map 300 of an airport runway 302, according to a non-limiting example embodiment.

Figure 4:
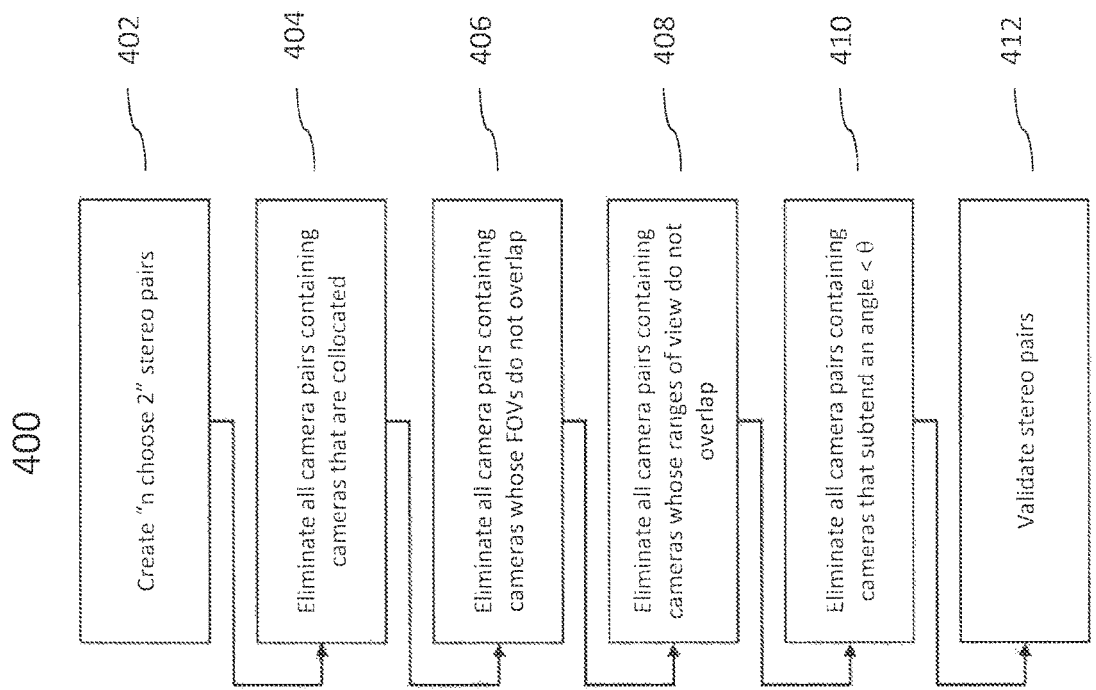
FIG. 4 is a flowchart illustrating a process for determining valid stereo pairs in the surveillance plan 200 according to an embodiment.

FIG. 4 is a flowchart illustrating a process for determining valid stereo pairs in the surveillance plan 200 according to an embodiment. In an embodiment, a valid stereo pair may comprise a pair of cameras used in 3D triangulation to determine the altitude of an object of interest. The pairs of cameras may comprise two cameras whose relationship to one another meets a preset criteria. For example, the criteria the relationship between the two cameras must meet may comprise the distance between the cameras, the overlap between the cameras' surveillance coverages, the overlap between the functional ranges of view, and if the principal rays of the cameras subtend at a threshold angle, to name some examples.

In an embodiment, the process for determining valid stereo pairs may be performed by the camera placement planner unit 106 when a camera is added to the system, removed from the system, or when an input placement is received.

According to an embodiment, at block 402, camera placement planner unit 106 may calculate a set of stereo pairs based on all possible stereo pairs in the surveillance plan 200. The set of stereo pairs may comprise pairs of the cameras and may be calculated in an n-choose-2 (combinations without replacement) manner. For example, for cameras A 204, B 206, C 208, and D 210, a set of stereos pairs comprising the pairs cameras A 204 and B 206, A 204 and C 208, A 204 and D 210, B 206 and C 208, B 206 and D 210, and C 208 and D 210.

At block 404, camera placement planner unit 106 eliminates all camera pairs from the set of stereo pairs in which both cameras are collocated. For example, if cameras A 204 and B 206 are collocated, or at the same location, then the camera pair A 204 and B 206 would be eliminated from the set of stereo pairs.

At block 406, camera placement planner unit 106 eliminates all camera pairs in the set of stereo pairs in which there is no overlap in the surveillance coverage of the two cameras. For example, surveillance coverage 212 of camera A 204 may not overlap with surveillance overage 218 of camera 210. Camera placement planner unit 106 would then eliminate the camera pair of A 204 and D 210 from the set of stereo pairs.

At block 408, camera placement planner unit 106 eliminates all camera pairs from the set of stereo pairs in which the functional range of view of the two cameras do not overlap. For example, the functional range of view of camera B 206 and C 208 may not overlap. In this case, the camera pair of B 206 and C 208 would be eliminated from the set of stereo pairs.

At block 410, camera placement planner unit 106 eliminates camera pairs from the set of stereo pairs in which the principal rays of the two cameras subtend at an angle that is less than a threshold angle. For example, the principal rays of cameras B 206 and D 210 may not subtend at an angle greater than a threshold angle. In this case, the camera pair of B 206 and D 210 would be eliminated from the set of stereo pairs.

At block 412, the set of stereo pairs are considered a set of valid stereo pairs and is sent to geolocation unit 112 for the computation of 3D points.

Figure 5:
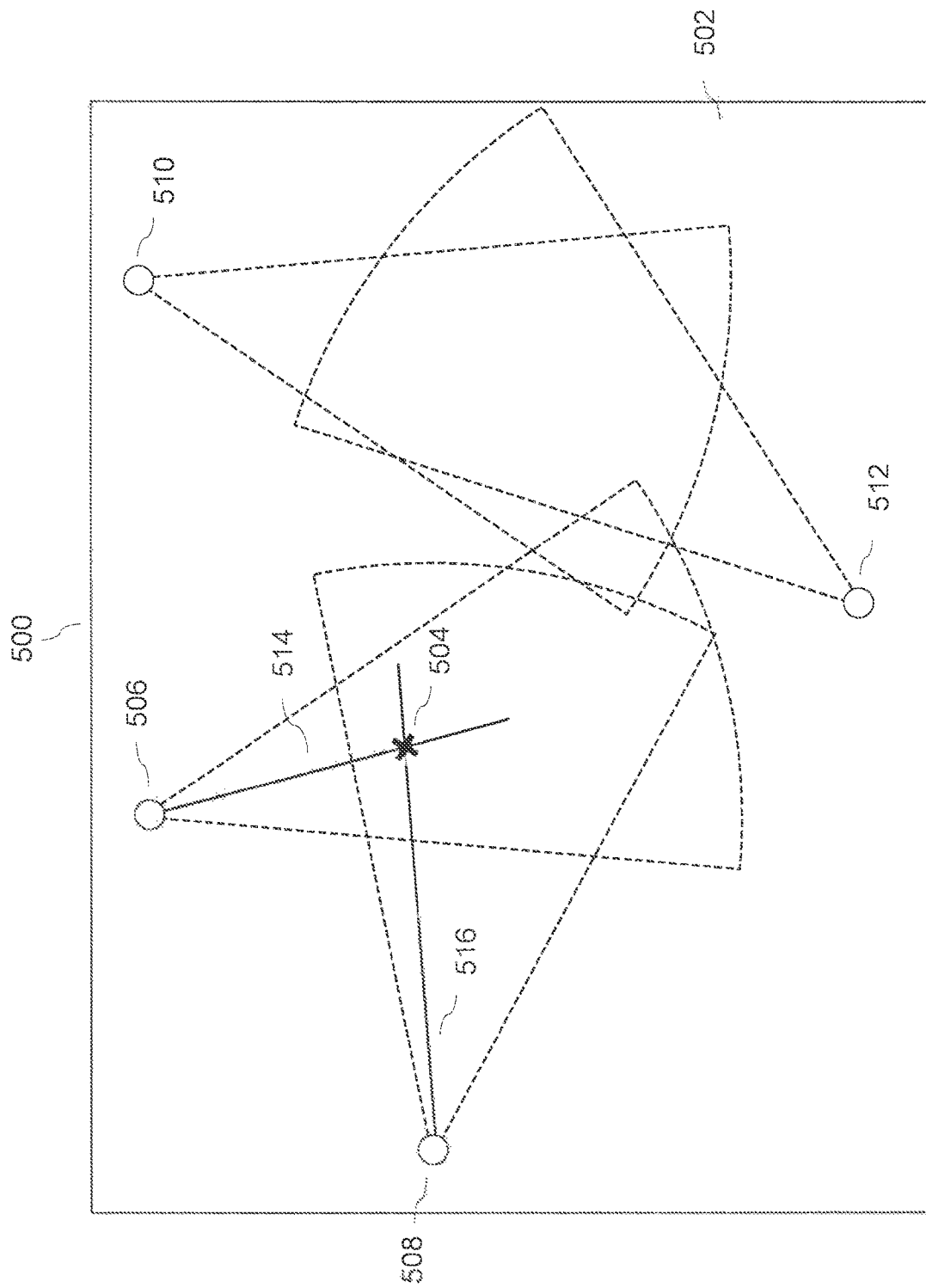
FIG. 5 is a diagram illustrating an example of highlighting valid stereo pairs on the map 500 of an area 502, according to an example embodiment.

FIG. 5 is a diagram illustrating an example of highlighting the valid stereo pairs used to compute a 3D location on the map 500 of an area 502, according to an embodiment.

In an embodiment, geolocation unit 112 may display the computed 3D position 504 on the map 500 of an area 502. Once the computed 3D position is displayed, geolocation unit 112 may highlight the valid stereo pairs used to compute the corresponding 3D location. Highlighting the valid stereo pairs used to compute the 3D position may comprise displaying lines (514 and 516) between the computed 3D position 504 and each infrared camera that provided object detection points, through the object detection unit 110, used to compute the 3D position.

For example, if the object detection unit 110 produced object detection points for infrared camera pairs A 506 and B 508, geolocation unit 112 subsequently computed 3D position 504 from these object detection points. Geolocation unit 112 may display lines (514 and 516) between the computed 3D position 504 and infrared cameras A 506 and B 508 to indicate which valid stereo pairs resulted in the computed 3D position.

In an embodiment, geolocation unit 112 may display a plurality of computed 3D positions and may highlight the valid stereo pairs for each of the plurality of positions.

FIG. 6 is a flowchart illustrating a process for determining an object of interest from a continuous stream of video frames, according to an embodiment.

At block 602, object detection unit 110 may receive a continuous stream of video from a camera. A frame of the received continuous stream of video may then undergo a background subtraction. In an embodiment, the background subtraction may comprise a Gaussian Mixture Model-based background subtraction.

At block 604, object detection unit 110 determines whether, after a frame of the continuous stream of video has undergone background subtraction, the frame displays one or more moving foreground objects. A moving foreground object may comprise an area in a frame that differs from a base background image stored in the object detection unit 110 and is distilled from the frame when the base background image is subtracted from the frame. If one or more moving foreground objects are present in the frame, the system continues to block 606. Otherwise block 602 is repeated using the next frame of the continuous stream of video.

For example, object detection unit 110 may have a base background image stored for camera A 204. When object detection unit 110 receives a frame from the continuous stream of video of camera A 204, object detection unit 110 would determine if any area of the frame from camera A 204 differs from the stored base background image and is distilled from the frame when the stored base background image is subtracted from the frame.

According to an embodiment, the areas that differ from a base background image may be actual objects that are changing positions from frame to frame, or the result of noise in the camera data, as an example.

In an embodiment, object detection unit 110 may determine that the frame displays a plurality of moving foreground objects.

At block 606, object detection unit 110 determines whether the moving foreground object can be associated with a foreground object identified in a previous frame and calculates a two-dimensional (2D) trajectory based upon the object's movement between a plurality of frames.

According to an embodiment, at block 606 object detection unit 110 performs optical flow tracking on the moving foreground object. Optical flow tracking may comprise assigning a movement vector, or small 2D trajectory, to a moving foreground object based on an identifying feature of the moving foreground object. In an embodiment, the identifying feature of the moving foreground object may comprise the brightness, corners, or linear edges of a moving foreground object—to name a few. Object detection unit 110 may compare the location of the identifying feature to the location of the identifying feature in a previous frame. Based upon the difference in location, object detection unit 110 may assign small 2D trajectory to the moving foreground object.

For example, the foreground object may comprise an identifying feature located at position X in a current frame at position Y in a previous frame. Based upon the identifying feature's movement between position X and position Y, the object detection unit may calculate a 2D trajectory for the moving foreground object.

In an embodiment, a foreground object may comprise a plurality of identifying features. A 2D trajectory may be assigned to each identifying feature of the foreground object based on the identifying features' movements between frames. A 2D trajectory for the moving foreground object is calculated by averaging the 2D trajectories of each identifying feature together.

According to an embodiment, at block 606, object detection unit 110 performs density-based clustering on a plurality of foreground objects. Density-based clustering may comprise comparing the 2D trajectories of any of the plurality of foreground objects which are within a threshold distance apart from each other. For example, comparing the 2D trajectories of foreground objects with are close together. If the difference between the compared 2D trajectories is too great then the moving foreground objects are kept separate, otherwise they are grouped together as one moving foreground object.

At block 608, object detection unit 110 determines if the moving foreground object is an existing or new object of interest. In an embodiment, object detection unit 110 may perform Kalman filtering on object detection points for objects of interest that are included on a tracking list. An object of interest may comprise an airplane or vehicle on the surface of an airport, to name an example. Kalman filtering may comprise calculating an estimated location and 2D trajectory for each tracked object of interest according to the object detection points. Object detection unit 110 then compares the location and 2D trajectory of the moving foreground object with the estimated locations and 2D trajectories of the tracked objects of interest. If the difference between the location and 2D trajectory of the moving foreground object and the estimated location and 2D trajectory of a tracked object of interest is within a certain threshold, then the moving foreground object is determined to be an existing object of interest. When the moving foreground object is determined to be an existing object of interest, the system will continue to block 612.

If the difference between the location and 2D trajectory of the moving foreground object and all the estimated locations and 2D trajectories of a tracked objects of interest is over a certain threshold, the moving foreground object is determined to be a new object of interest. The new object of interest undergoes a threshold filtering. In an embodiment, the threshold filtering comprises a size and trajectory threshold filtering. For example, object detection unit 110 may determine if the size and trajectory meet a certain threshold. If the new object of interest does not meet the threshold for size and trajectory the system will continue on to block 610, otherwise the system will continue on to block 612.

At block 610, the new object of interest is discarded. The system then continues to block 618.

At block 612, object detection unit 110 adds a new object detection point for a newly designated object of interest or an existing object of interest to the tracking list. The object detection point, may comprise of the location, size, 2D trajectory, and unique identifier of the object of interest, to name a few. The system then proceeds to block 614.

At block 614, object detection unit 110 determines whether the object of interest has been persistently identified, with consistent location, size, and 2D trajectory attributes in a threshold number of frames. If the object of interest has been persistently tracked in a threshold number of frames, the system will continue to block 616. Otherwise, the system proceeds to block 618.

At block 616, the object of interest is included in the update list that is continuously sent to geolocation unit 112. According to an embodiment, the object of interest is removed from the update list when the object of interest has not been persistently identified in a threshold number of frames. The system then continues to block 618.

At block 618, object detection unit 110 determines if there has been a determination whether each of the plurality of moving foreground objects displayed by the frame is an object of interest or not. If a determination has not been made for each of the plurality of moving foreground objects displayed in the frame, then block 608 is repeated for a different moving foreground object from the plurality of moving foreground objects. Otherwise, block 602 is repeated using the next frame of the continuous stream video.

Figure 7:
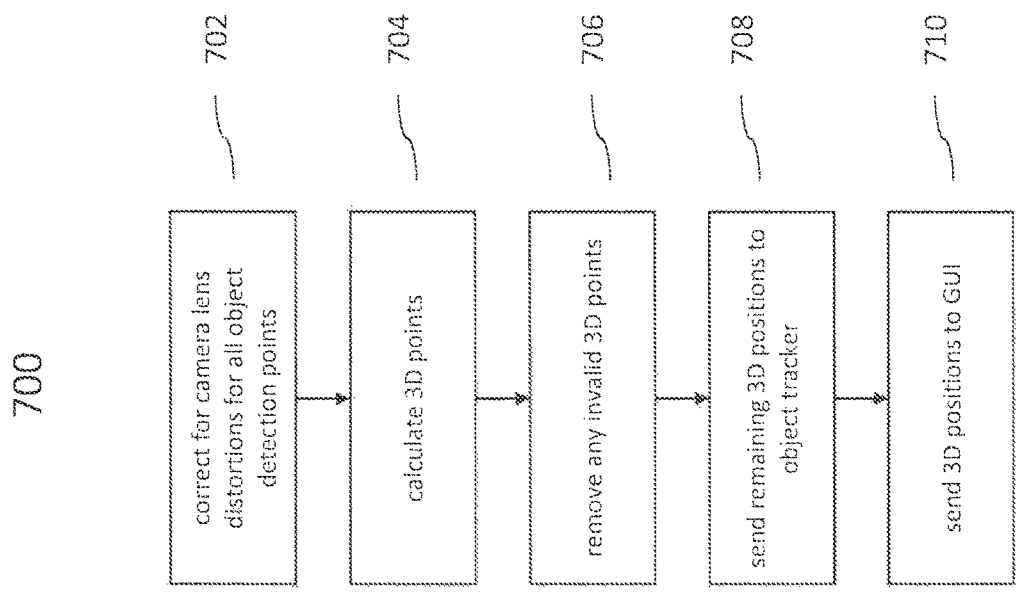
FIG. 7 is a flowchart illustrating a process for computing 3D positions for display on GUI 114 according to an embodiment.

FIG. 7 is a flowchart illustrating a process for computing 3D positions for display on GUI 114 according to an embodiment.

At block 702, geolocation unit 112 receives an object detection point and corrects the 2D location of the object detection point for any distortions produced by the camera's lens. In an embodiment, the correction of the 2D location of the object detection point may be performed according to the updated specification input.

At block 704, geolocation unit 112 may calculate all possible 3D positions the corrected object detection points. The 3D positions may comprise a latitude, a longitude, and an altitude. Calculating the 3D position may comprise 3D triangulation. Geolocation unit 112 may use the object detection points produced by the object detection unit 110 to calculate a 3D position.

At block 706, geolocation unit 112 determines if the 3D position for the object of interest comprises an invalid point. An invalid point may comprise a 3D position that comprises a negative altitude, a location outside of an area of interest, or a location historically associated with false targets, to name a few. For example, a 3D position on a highway outside the perimeter of an airport would be outside the area of interest and be determined to be an invalid point. All such points are removed from the set of computed 3D positions computed in block 704.

At block 708, geolocation unit 112 adds the remaining computed 3D points to the object tracker. The object tracker may maintain the continuity of the 3D positions calculated from the object detection points when object detection unit 110 cannot support the continuous presence of previously detected objects.

At block 710, geolocation unit 112 sends all 3D positions maintained in the object tracker, if any, to GUI 114.

Figure 8:
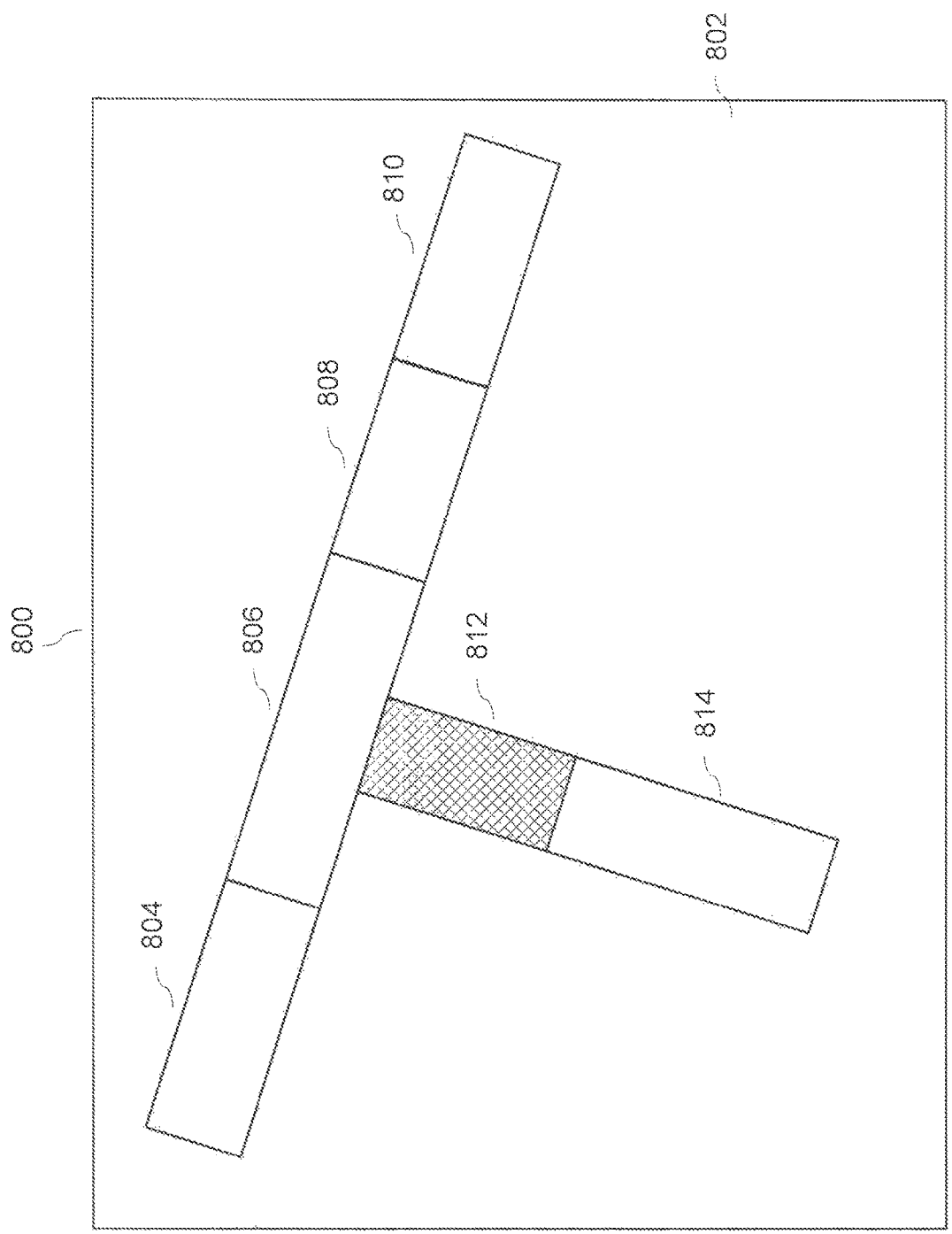
FIG. 8 is a diagram illustrating an example of GUI 114 displaying a map separated into blocks, according to an example embodiment.
Figure 9:
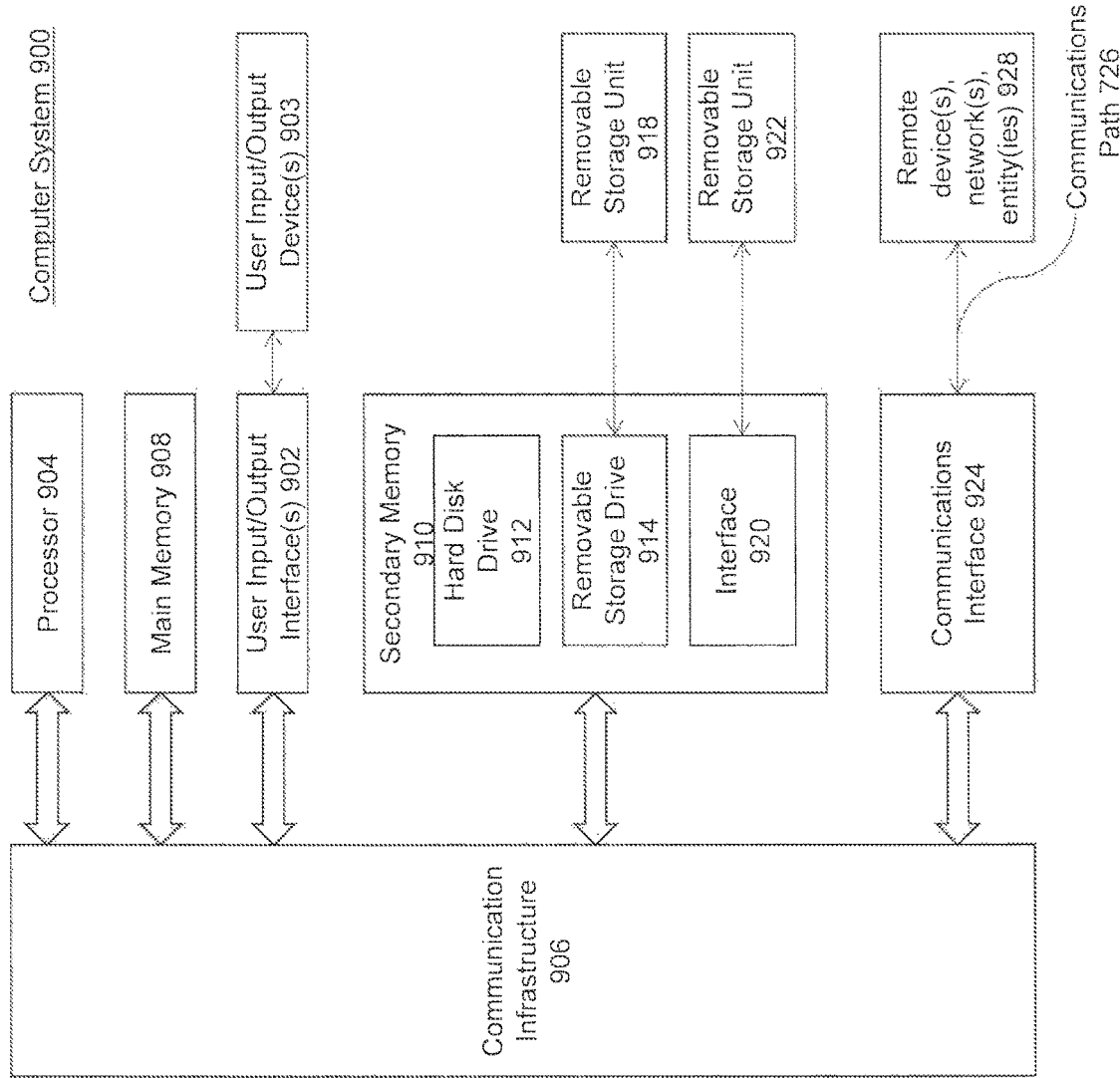
FIG. 9 is an example computer system useful for implementing various embodiments.

FIG. 8 is a diagram illustrating an example of GUI 114 displaying a map separated into blocks, according to an embodiment.

GUI 114 may display a map 800 of an area 802 separated into blocks. The blocks define and encompass discrete areas that the user requires surveillance. The blocks may or may not be contiguous. For example, the map 800 of an area 802 may be separated into blocks A, B, C, D, E, and F blocks (804, 806, 808, 810, 812, and 814, respectively). In an embodiment, individual blocks may vary in size (length, width and shape) from other blocks. GUI 114 may receive and track 3D position updates for each object of interest identified by the system. The 3D position updates may comprise the longitudes, latitudes, and altitudes of an object of interest calculated from a plurality of frames from a continuous video stream. GUI 114 may average the tracked 3D position updates to calculate a single longitude, latitude, and altitude for the object of interest.

In an embodiment, GUI 114 may average the tracked 3D position updates to calculate a plurality of single longitude, latitude, and altitude for a plurality of objects of interest.

According to an embodiment, GUI 114 may then determine whether a single longitude, latitude, and altitude of the object of interest is within one of the blocks (804, 806, 808, 810, 812, and 814) that map 800 of an area 802 is separated into. For example, once GUI 114 calculates a single longitude, latitude, and altitude of an object of interest, GUI 114 may determine that the single longitude, latitude, and altitude are within block E 812.

In an embodiment, when a single longitude, latitude, and altitude of an object of interest is in a block on the map, GUI 114 may highlight the block the single longitude, latitude, and altitude are in. For example, if the single longitude, latitude, and altitude are within block E 812, then GUI 114 would highlight block D 812 on the map 800 of the area 802.

According to an embodiment, GUI 114 may determine that a plurality of single longitude, latitude, and altitude of a plurality of objects of interest are within a block on the map. When a plurality of single longitudes, latitudes, and altitudes of a plurality of objects of interests are within a block, GUI 114 may highlight a block and display the number of objects of interests within the block.

Various embodiments can be implemented, for example, using one or more well-known computer systems, such as computer system 900 shown in FIG. 8. Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, blocks, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method, comprising:
   receiving a video stream having a frame from a first camera of a valid stereo pair of cameras;
   applying background subtraction to the frame from the first camera to identify a moving foreground object;
   calculating a difference between a 2D trajectory of the moving foreground object and an estimated 2D trajectory of a previously determined object of interest;
   determining that the moving foreground object corresponds to the previously determined object of interest based on the difference being less than a threshold value;
   in response to determining that the moving foreground object corresponds to the previously determined object of interest, identifying the frame from the first camera as another frame instance of the previously determined object of interest;
   detecting the previously determined object of interest across a set threshold number of frames of each continuous video stream from a corresponding camera of the valid stereo pair of cameras;
   in response to detecting the previously determined object of interest across the set threshold number of frames of each continuous video stream, calculating a geolocation of the previously determined object of interest by comparing a 2D location of the previously determined object of interest in the frame from the first camera to a 2D location of the previously determined object of interest in another frame from a second camera of the valid stereo pair of cameras; and
   tracking the geolocation of the previously determined object of interest.

2. The computer-implemented method of claim 1, wherein the tracking further comprises:
   adding the previously determined object of interest to a list of objects; and
   tracking the geolocation of each object in the list of objects.

3. The computer-implemented method of claim 1, wherein the applying the background subtraction further comprises:
   subtracting a base background image corresponding to a camera corresponding to the video stream.

4. The computer-implemented method of claim 1, further comprising:
   identifying a plurality of moving foreground objects; and
   iteratively determining whether each of the plurality of moving foreground objects corresponds to the previously determined object of interest.

5. The computer-implemented method of claim 1, further comprising:
   identifying a second moving foreground object;
   calculating a difference between a 2D trajectory of the second moving foreground object and the estimated 2D trajectory of the previously determined object of interest;
   determining that the difference exceeds a threshold; and
   in response to determining that the difference exceeds the threshold, determining that the second moving foreground object is a new object of interest.

6. The computer-implemented method of claim 1, wherein the geolocation is a 3D position of the previously determined object of interest.

7. A system, comprising:
   a memory; and
   at least one processor coupled to the memory and configured to:
   receive a video stream having a frame from a first camera of a valid stereo pair of cameras;
   apply background subtraction to the frame from the first camera to identify a moving foreground object;
   calculate a difference between a 2D trajectory of the moving foreground object and an estimated 2D trajectory of a previously determined object of interest;

determine that the moving foreground object corresponds to the previously determined object of interest based on the difference being less than a threshold value;

in response to determining that the moving foreground object corresponds to the previously determined object of interest, identify the frame from the first camera as another frame instance of the previously determined object of interest;

detect the previously determined object of interest across a set threshold number of frames of each continuous video stream from a corresponding camera of the valid stereo pair of cameras;

in response to detecting the previously determined object of interest across the set threshold number of frames of each continuous video stream, calculate a geolocation of the previously determined object of interest by comparing a 2D location of the previously determined object of interest in the frame from the first camera to a 2D location of the previously determined object of interest in another frame from a second camera of the valid stereo pair of cameras; and track the geolocation of the previously determined object of interest.

8. The system of claim 7, wherein to track the geolocation, the at least one processor is further configured to:

add the previously determined object of interest to a list of objects; and track the geolocation of each object in the list of objects.

9. The system of claim 7, wherein to apply the background subtraction, the at least one processor is further configured to:

subtract a base background image corresponding to a camera corresponding to the video stream.

10. The system of claim 7, wherein the at least one processor is further configured to:

identify a plurality of moving foreground objects; and iteratively determine whether each of the plurality of moving foreground objects corresponds to the previously determined object of interest.

11. The system of claim 7, wherein the at least one processor is further configured to:

identify a second moving foreground object;

calculate a difference between a 2D trajectory of the second moving foreground object and the estimated 2D trajectory of the previously determined object of interest;

determine that the difference exceeds a threshold; and in response to determining that the difference exceeds the threshold, determine that the second moving foreground object is a new object of interest.

12. The system of claim 7, wherein the geolocation is a 3D position of the previously determined object of interest.

13. A non-transitory computer-readable device having instructions stored thereon that, when executed by at least one computing device, cause the at least one computing device to perform operations comprising:

receiving a video stream having a frame from a first camera of a valid stereo pair of cameras;

applying background subtraction to the frame from the first camera to identify a moving foreground object;

calculating a difference between a 2D trajectory of the moving foreground object and an estimated 2D trajectory of a previously determined object of interest;

determining that the moving foreground object corresponds to the previously determined object of interest based on the difference being less than a threshold value;

in response to determining that the moving foreground object corresponds to the previously determined object of interest, identifying the frame from the first camera as another frame instance of the previously determined object of interest;

detecting the previously determined object of interest across a set threshold number of frames of each continuous video stream from a corresponding camera of the valid stereo pair of cameras;

in response to detecting the previously determined object of interest across the set threshold number of frames of each continuous video stream, calculating a geolocation of the previously determined object of interest by comparing a 2D location of the previously determined object of interest in the frame from the first camera to a 2D location of the previously determined object of interest in another frame from a second camera of the valid stereo pair of cameras; and tracking the geolocation of the previously determined object of interest.

14. The non-transitory computer-readable device of claim 13, wherein to track the geolocation, the operations further comprise:

adding the previously determined object to a list of objects; and tracking the geolocation of each object in the list of objects.

15. The non-transitory computer-readable device of claim 13, wherein to apply the background subtraction, the operations further comprise:

subtracting a base background image corresponding to a camera corresponding to the video stream.

16. The non-transitory computer-readable device of claim 13, the operations further comprising:

identifying a plurality of moving foreground objects; and iteratively determining whether each of the plurality of moving foreground objects corresponds to the previously determined object of interest.

17. The non-transitory computer-readable device of claim 13, the operations further comprising:

identifying a second moving foreground object;

calculating a difference between a 2D trajectory of the second moving foreground object and the estimated 2D trajectory of the previously determined object of interest;

determining that the difference exceeds a threshold; and in response to determining that the difference exceeds the threshold, determining that the second moving foreground object is a new object of interest.

18. The computer-implemented method of claim 1, wherein the calculating the difference between the 2D trajectory of the moving foreground object and the estimated 2D trajectory of the previously determined object of interest further comprises:

calculating the difference based on at least one of a brightness, corner, or linear edge of the moving foreground object and at least one of a brightness, corner, or linear edge of the previously determined object of interest.

19. The system of claim 7, wherein to calculate the difference between the 2D trajectory of the moving foreground object and the estimated 2D trajectory of the previously determined object of interest, the at least one processor is further configured to:
  calculate the difference based on at least one of a brightness, corner, or linear edge of the moving foreground object and at least one of a brightness, corner, or linear edge of the previously determined object of interest.

20. The non-transitory computer-readable device of claim 13, wherein to calculate the difference between the 2D trajectory of the moving foreground object and the estimated 2D trajectory of the previously determined object of interest, the operations further comprise:
  calculating the difference based on at least one of a brightness, corner, or linear edge of the moving foreground object and at least one of a brightness, corner, or linear edge of the previously determined object of interest.

* * * * *